(12) United States Patent
Schliwa-Bertling et al.

(10) Patent No.: US 9,942,899 B2
(45) Date of Patent: Apr. 10, 2018

(54) NETWORK NODE AND METHOD THEREIN FOR MANAGING RADIO RESOURCES

(71) Applicant: Telefonaktiebolaget L M Ericsson (publ), Stockholm (SE)

(72) Inventors: Paul Schliwa-Bertling, Ljungsbro (SE); Eric Nordström, Stockholm (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 14/407,847

(22) PCT Filed: Aug. 16, 2013

(86) PCT No.: PCT/SE2013/050977
§ 371 (c)(1),
(2) Date: Dec. 12, 2014

(87) PCT Pub. No.: WO2014/031064
PCT Pub. Date: Feb. 27, 2014

(65) Prior Publication Data
US 2015/0173078 A1    Jun. 18, 2015

Related U.S. Application Data

(60) Provisional application No. 61/691,385, filed on Aug. 21, 2012.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/003* (2013.01); *H04L 5/0058* (2013.01);
(Continued)

(58) Field of Classification Search
None
See application file for complete search history.

(56) References Cited

U.S. PATENT DOCUMENTS

| | | | |
|---|---|---|---|
| 2003/0054829 A1* | 3/2003 | Moisio | H04W 72/10 455/452.1 |
| 2005/0174958 A1* | 8/2005 | Miller | H04W 28/20 370/321 |

(Continued)

FOREIGN PATENT DOCUMENTS

| | | |
|---|---|---|
| EP | 1786219 A1 | 5/2007 |
| WO | 2007075133 A1 | 7/2007 |
| WO | 2013158023 A1 | 10/2013 |

OTHER PUBLICATIONS

3GPP, "3rd Generation Partnership Project; Technical Specification Group GSM/EDGE Radio Access Network; Feasibility study for evolved GSM/EDGE Radio Access Network (GERAN) (Release 10)", 3GPP TR 45.912 V10.0.0, Mar. 2011, 1-517.

(Continued)

*Primary Examiner* — Anh-Vu Ly
*Assistant Examiner* — Hector Reyes Ortiz
(74) *Attorney, Agent, or Firm* — Murphy, Bilak & Homiller, PLLC

(57) ABSTRACT

Method in a network node for managing radio resources. The network node is comprised in a wireless radio network. A mobile station is configured to operate in the wireless radio network. The mobile station has a maximum bandwidth for simultaneous receptions, and a first carrier list comprising carriers. The carriers are radio carriers assigned to the mobile station. The maximum bandwidth cannot envelope all the carriers in the first carrier list. The network node removes one or more carriers from the first carrier list. The removing of the one or more carriers is performed, one carrier by one carrier, until the maximum bandwidth can envelope all remaining carriers after the removing. The one or more removed carriers have a lowest priority according to (Continued)

a priority list. The remaining carriers comprise carriers to receive for the mobile station.

32 Claims, 8 Drawing Sheets

(51) Int. Cl.
  *H04W 72/10* (2009.01)
  *H04W 88/02* (2009.01)
(52) U.S. Cl.
  CPC ......... *H04W 72/048* (2013.01); *H04W 72/10* (2013.01); *H04W 88/02* (2013.01)

(56) References Cited

U.S. PATENT DOCUMENTS

2010/0034160 A1* 2/2010 Prakash ................ H04W 68/02 370/329
2011/0081936 A1* 4/2011 Haim ................ H04W 52/367 455/522
2013/0142139 A1* 6/2013 Kitazoe ................ H04W 28/20 370/329

OTHER PUBLICATIONS

3GPP, "3rd Generation Partnership Project; Technical Specification Group GSM/EDGE Radio Access Network; Multiplexing and multiple access on the radio path (Release 10)", 3GPP TS 45.002 V10.3.0, Mar. 2012, 1-112.

Unknown, Author, "Downlink Multi-carrier for EDGE", Telefon AB LM Ericsson, St-Ericsson SA, 3GPP TSG Geran#54, GP-120691, Sanya, P.R. China, May 14-18, 2012.

Unknown, Author, "Physical Channel Definition for Downlink Dual Carrier Operation", Motorola, 3GPP TSG GERAN#29, GP-060730, San Jose Del Cabo, Mexico, Apr. 24-28, 2006.

* cited by examiner

NETWORK NODE AND METHOD THEREIN FOR MANAGING RADIO RESOURCES

TECHNICAL FIELD

This disclosure relates to a method in a network node for managing radio resources when the maximum bandwidth for simultaneous receptions of a mobile station cannot envelope all radio carriers assigned to the mobile station.

BACKGROUND

Communication devices such as terminals are also known as e.g. User Equipments (UE), mobile terminals, wireless terminals and/or Mobile Stations (MS). Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression DownLink (DL) is used for the transmission path from the base station to the mobile station. The expression UpLink (UL) is used for the transmission path in the opposite direction i.e. from the mobile station to the base station.

Dual Carrier Downlink (DCDL) was specified in 3GPP Global System for Mobile communications (GSM) Enhanced Data rate for GSM Evolution (EDGE) Radio Access Network (GERAN) Rel-7 as one part of the set of features called GERAN Evolution investigated in the feasibility study in 3GPP TR45.912, "Feasibility study for evolved GSM/EDGE Radio Access Network (GERAN)". The feature introduces two parallel carriers transmitted on the DL to the same MS receiver.

The specification work on DCDL was mainly focusing on protocol aspects by simply extending the single carrier transmission to two separate carriers transmitted in parallel. Thus, any Radio Frequency (RF) related requirements were not modified. This, in effect also requires the terminal to implement two parallel receive chains, putting additional requirements on the analogue components in the terminal, increasing terminal cost.

However, a Multi-carrier DL proposal, such as that in GP-120691, "Downlink Multi-carrier for GERAN", source Telefon AB LM Ericsson, ST-Ericsson SA. GERAN#55, makes use of a wider carrier selection filter, based on what is available from other wideband technologies, eliminating the need for separate components for the parallel carrier reception. With a wider carrier selection filter there is a need to relax current RF requirements to allow for cost efficient implementations.

Solutions on how to signal the multicarrier capability to the network and also how a set of rules can be specified to get a common understanding between the MS and the network on what carriers to receive at a certain point in time, are previously known. This is important for efficient usage of the spectrum in the case the maximum carrier separation is larger than the carrier selection filter.

Other solutions are based on a prioritized carrier.

These solutions discuss ways to utilize the limited MS receive BandWidth (BW) in a good way. The generalized problem itself can be quite challenging and one can imagine many simplified methods that would do an acceptable yet sub-optimal job with comparable results.

However, one of the more important considerations these days is to limit MS computational complexity. Thus, a solution that is good-enough from the perspective of performance, but that involves very low MS computational complexity would be particularly useful.

With a GSM DL multicarrier feature, a MS can receive data on several carrier frequencies simultaneously, see for example GP-120691, "Downlink Multi-carrier for GERAN", source Telefon AB LM Ericsson, ST-Ericsson SA. GERAN#55. However, the feature is based on wideband receiver at the terminal side, and therefore, the MS would have a limited bandwidth where this is possible. Thus, a method is needed to select what carrier frequencies to receive given a GSM cell configuration. This problem has already been addressed but the known methods will not ensure a high number of carriers received, while at the same time achieving low computational complexity. A brute force method that searches through all possible carrier combinations, determining the optimum choice to achieve reception of the maximum number of carriers, can be quite demanding and might not be preferable in either network or MS implementations.

Frequency Hopping in GSM

The radio resource to use for a specific carrier assigned in GSM/EDGE is determined by the Mobile Allocation (MA), Mobile Allocation Index Offset (MAIO) and Hopping Sequence Number (HSN) for a hopping assignment, and the Absolute Frequency Radio Channel Number (ARFCN) for a non-hopping channel.

Below is a short description in words of the procedure in detail outlined in 3GPP TS 45.002, see 3GPP TS 45.002, for example, version 10.3.0, "Multiplexing and multiple access on the radio path", section 6.2:

The MA contains a list of ARFCNs that the MS should hop over in its allocation, and the HSN contains the pseudo-random, pre-determined hopping sequence to use. The hopping sequence will be used by all connections assigned the same HSN. In order to ensure orthogonality between the assigned channels, each channel is assigned a unique offset to the assigned hopping sequence called MAIO (Mobile Allocation Index Offset). The ARFCN to use in a certain Time Division Multiple Access (TDMA) frame is determined by:

mod(HSN(FN)+MAIO,N), where N is the number of ARFCNs in the MA, and FN is the Frame Number.

The multicarrier proposal outlined in GP-120691, "Downlink Multi-carrier for GERAN", source Telefon AB LM Ericsson, ST-Ericsson SA. GERAN#55 does not change the above described functionality but will extend the concept to apply to multiple carriers, i.e., a MS assigned in multi-carrier mode will, in each frame, potentially receive the same number of, different, ARFCNs as the number of carriers assigned. The most straightforward, and probable, implementation of the feature is to use the same HSN for all carriers but assign different MAIO values.

Further, compared to single carrier assignments, there will be a coupling between received bursts of a radio block, i.e., since the basic transmission format, a radio block, is transmitted over four bursts, often on different ARFCNs, the same carriers need to be received in all four bursts in order to be able to receive the full data block. That is, in order to avoid reception of fractional radio blocks. If a fractional radio block is received, the possibility to decode the payload carried by the radio block may be dependent on the channel coding used. This dependency may be avoided if only full radio blocks are received.

SUMMARY

It is therefore an object of embodiments herein to provide a way of improving the managing radio resources in a wireless radio network with low computational complexity.

According to a first aspect of embodiments herein, the object is achieved by a method in a network node for managing radio resources. The network node is comprised in a wireless radio network. A mobile station is configured to operate in the wireless radio network. The mobile station has a maximum bandwidth for simultaneous receptions, and a first carrier list comprising carriers. The carriers are radio carriers assigned to the mobile station. The maximum bandwidth cannot envelope all the carriers in the first carrier list. The network node removes one or more carriers from the first carrier list. The removing of the one or more carriers is performed, one carrier by one carrier, until the maximum bandwidth can envelope all remaining carriers after the removing. The one or more removed carriers have a lowest priority according to a priority list. The remaining carriers comprise carriers to receive for the mobile station.

According to a second aspect of embodiments herein, the object is achieved by a method in the mobile station for managing radio resources. The mobile station is configured to operate in the wireless radio network. The mobile station has the maximum bandwidth for simultaneous receptions and the first carrier list comprising carriers. The carriers are the radio carriers assigned to the mobile station. The maximum bandwidth cannot envelope all carriers in the first carrier list. The mobile station removes one or more carriers from the first carrier list. The removing of the one or more carriers is performed, one carrier by one carrier, until the maximum bandwidth can envelope all remaining carriers after the removing. The one or more removed carriers have the lowest priority according to the priority list. The remaining carriers comprise carriers to receive for the mobile station. The mobile station proceeds with radio reception on the determined carriers.

According to a third aspect of embodiments herein, the object is achieved by the network node for managing radio resources. The network node is configured to be comprised in the wireless radio network. The mobile station is configured to operate in the wireless radio network. The mobile station has the maximum bandwidth for simultaneous receptions and the first carrier list comprising carriers. The carriers are radio carriers assigned to the mobile station. The maximum bandwidth cannot envelope all the carriers in the first carrier list. The network node comprises a removing circuit. The removing circuit is configured to remove one or more carriers from the first carrier list. To remove the one or more carriers is configured to be performed, one carrier by one carrier, until the maximum bandwidth can envelope all remaining carriers after the removing. The one or more removed carriers have the lowest priority according to the priority list. The remaining carriers comprise carriers to receive for the mobile station.

According to a fourth aspect of embodiments herein, the object is achieved by the mobile station for managing radio resources. The mobile station is configured to operate in the wireless radio network. The mobile station has the maximum bandwidth for simultaneous receptions and the first carrier list comprising carriers. The carriers are radio carriers assigned to the mobile station. The maximum bandwidth cannot envelope all carriers in the first carrier list. The mobile station comprises a removing circuit configured to remove one or more carriers from the first carrier list. To remove the one or more carriers is configured to be performed, one carrier by one carrier, until the maximum bandwidth can envelope all remaining carriers after the removing. The one or more removed carriers have the lowest priority according to the priority list. The remaining carriers comprise carriers to receive for the mobile station. The mobile station further comprises a reception circuit configured to proceed with radio reception on the determined carriers.

By removing the one or more carriers from the first carrier list having the lowest priority, one by one, until the maximum bandwidth of the mobile station can envelope all remaining carriers after the removing, carriers to receive for the mobile station may be determined with low complexity involving reduced computational complexity.

When faced with the problem of what carriers to receive when receive bandwidth is limited the claimed methods with a list of prioritized carriers have the advantages of having low complexity. Given a priority list and a MS receive BW, both MS and network may quickly and unambiguously determine what carriers may be used for traffic in a radio block period. Thus, an improved method to manage radio resources is provided, which may avoid any waste of radio resources, while keeping a low complexity implementation in both mobile station and network.

BRIEF DESCRIPTION OF THE DRAWINGS

The accompanying drawings, which are included to provide a further understanding of the disclosure and are incorporated in and constitute a part of this application, illustrate certain non-limiting embodiment(s). In the drawings.

DETAILED DESCRIPTION

According to some embodiments, methods in network nodes and/or user nodes are provided for managing radio resources by providing a set of rules.

These methods have been developed taking into consideration the functioning on Frequency hopping in GSM, which is summarized below.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 1:
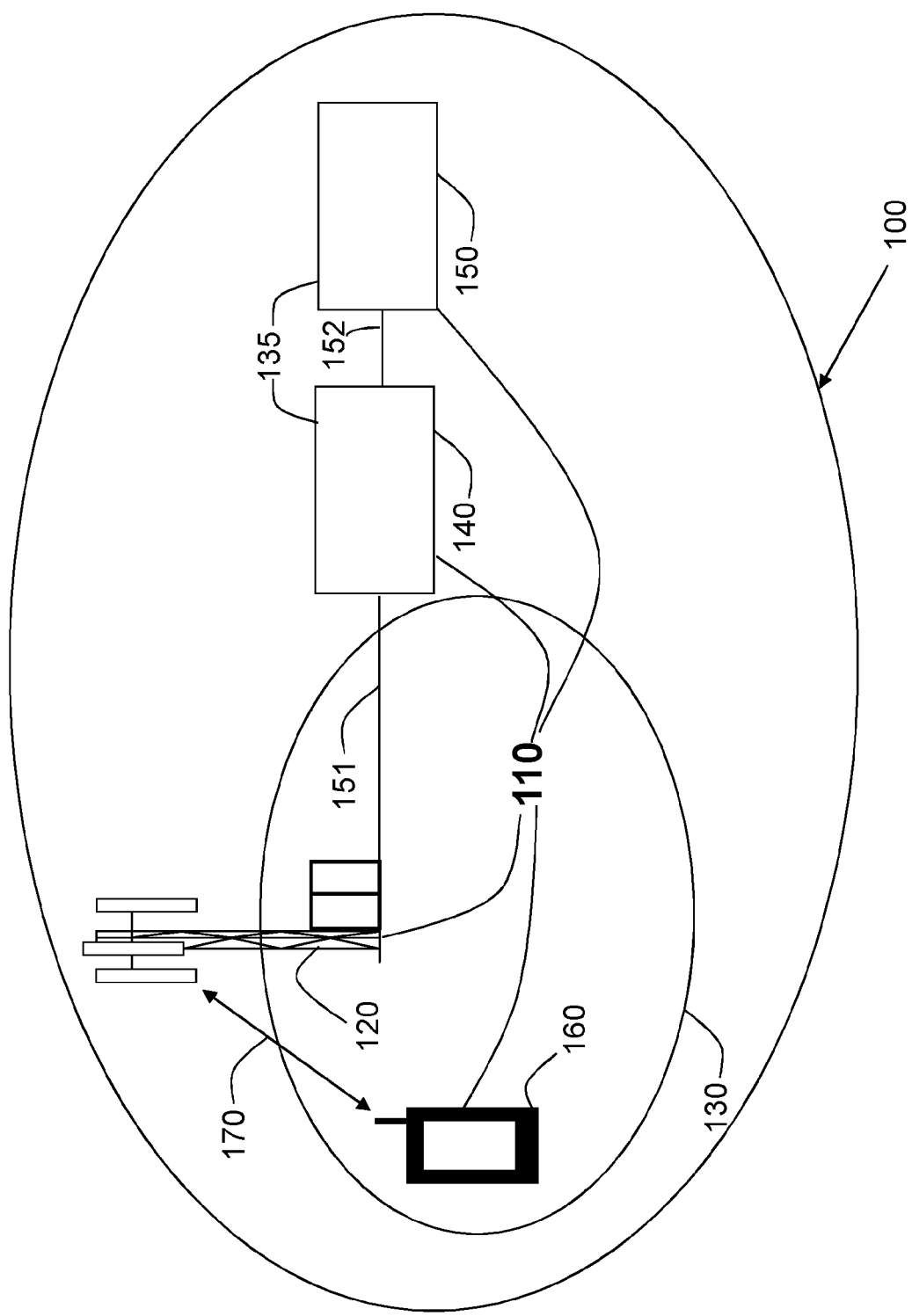
FIG. 1 illustrates a schematic block diagram of a wireless communications network, according to some embodiments.

FIG. 1 depicts a wireless radio network 100 in which embodiments herein may be implemented. The wireless radio network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), Wideband Code Division Multiple Access (WCDMA), Universal Terrestrial Radio Access (UTRA) TDD, Global System for Mobile communications (GSM) network, GSM/Enhanced Data rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., or, in general terms, any cellular network or system.

The wireless radio network 100 comprises a network node 110. The network node 110 may be, for example, a base station 120 such as e.g., an eNB, eNodeB, or a Home Node B, a Home eNode B, femto Base Station, BS, pico BS, Base Transceiver Station (BTS), or any other network unit capable to serve a device or a machine type communication device in a wireless radio network 100. In some particular embodiments, the base station 120 may be a stationary relay node or a mobile relay node. The wireless radio network 100 covers a geographical area which is divided into cell areas, wherein each cell area is served by a network node, although, one network node may serve one or several cells. In the examples depicted in FIG. 1, the base station 120 serves a cell 130. The base station 120 may be of different classes, such as e.g. macro eNodeB, home eNodeB or pico base station, based on transmission power and thereby also cell size. Typically, wireless radio network 100 may comprise more cells similar to cell 130, served by their respective network nodes. This is not depicted in FIG. 1 for the sake of simplicity. The network node 110 may support one or several communication technologies, and its name may depend on the technology and terminology used. In 3GPP GERAN, network nodes such as the base station 120, which may be referred to as BTS or Radio Base Station (RBS), may be directly connected to one or more networks 135, e.g., core networks or the internet. The network node 110 may be any of the nodes in these one or more networks. For example, in GSM, the base station 120 may be connected to a Base Station Controller (BSC) 140 and a core network node 150. The base station 120 may communicate with the one or more networks 135, e.g., the BSC 140, over a link 151. The BSC 140 may communicate with the core network node 150 over a link 152. Any reference to a "network" herein is meant to comprise a reference to the network node 110 when the network node 110 is one of: the base station 120, the base station controller 140 and the core network node 150, indistinctively, unless noted otherwise.

The network node 110 may also be a user node, such as a UE, i.e., mobile station, a telemetry node, a communication node in a car, or any type of node communicating in a radio network system. All these user nodes are referred to herein as mobile stations. A number of mobile stations are located in the wireless radio network 100. In the example scenario of FIG. 1, only one mobile station is shown, mobile station 160. Any reference to a "user node" "mobile station" or "MS" herein is meant to comprise a reference to the mobile station 160, indistinctively, unless noted otherwise. The mobile station 160 may communicate with the network node 110 over a radio link 170.

The mobile station 160 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

The mobile station 160 may further be referred to as a mobile telephone, cellular telephone, or laptop with wireless capability, just to mention some further examples. The mobile station 160 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

According to some embodiments herein, the mobile station 160 when, for example, assigned on Packet Data physical Channels (PDCHs) that are separated in frequency beyond what the carrier selection filter is capable of receiving, may have a clear and unambiguous set of rules on what radio resources that should be abandoned, as described below.

According to some embodiments herein, which are further detailed below, the mobile station 160 may be made aware of a priority order of the carrier frequencies, e.g. MAIO, in its allocation, i.e., assignment. Whenever a situation may arise where the mobile station 160 cannot receive data that constitute a radio block on all necessary carrier frequencies in a given set of TDMA frame, e.g., 4 consecutive TDMA frames from the Basic Transmission Time Interval (BTTI) configuration, it may abandon carrier frequencies, one after the other, until all remaining assigned resources may be received. To maintain an efficient system of resource utilization, the network, e.g., the network node 110 when the network node 110 is one of: the base station 120, the base station controller 140 and the core network node 150, may do the same simple exercise to avoid sending data that the mobile, e.g., the mobile station 160, may anyway not listen to and which thus may have to be re-transmitted, e.g., for the mobile to receive it. The priority order and how to determine it may be specified in a specification, in order for the mobile station 160 and the network, e.g., the network node 110 when the network node 110 is one of: the base station 120, the base station controller 140 and the core network node 150, to have a common understanding on what radio resources are the ones that may need to be abandoned. Alternatively, means to signal the priority order to use from the network to the mobile station 160 may be specified.

Assuming that a mobile station, such as mobile station 160 or MS, is assigned multiple carriers, N, and that the received bandwidth of the mobile station 160 is smaller than the span of the MA, i.e., the list of possible absolute frequency channels to receive, the procedure to determine which of the carriers to receive in each radio block period transmission is described in the following section.

Further, in some embodiments, it may be assumed that:

1. The MOBILE STATION 160 may signal to the network, e.g., the network node 110 when the network node 110 is one of: the base station 120, the base station controller 140 and the core network node 150, on the maximum bandwidth it may support for simultaneous receptions.

2. The MOBILE STATION 160 may, between each Time Division Multiple Access (TDMA) frame, re-tune its filter to follow the frequency hopping carriers, i.e., the reception of each frame may be considered separately, in terms of the ARFCN/frequency to consider.

3. The MOBILE STATION 160 may signal to the network, e.g., the network node 110 when the network node 110 is one of: the base station 120, the base station controller 140 and the core network node 150, on the maximum number of carriers it supports for simultaneous receptions.

4. The MOBILE STATION 160 may signal to the network, e.g., the network node 110 when the network node 110 is one of: the base station 120, the base station controller 140 and the core network node 150, on the reduced number of timeslots from the maximum number of timeslots, given its multislot class, see 3GPP TS 45.002, for example, version 10.3.0, "Multiplexing and multiple access on the radio path", Annex B, and maximum number of signaled carriers. This signaling may be related to the baseband capability, i.e. computational power, of the mobile station 160.

As an exemplary overview described further down, the subject matter disclosed herein may, for example, comprise of the following steps:

A. The network, e.g., the network node 110 when the network node 110 is one of: the base station 120, the base station controller 140 and the core network node 150, may prioritize carriers in, for example, the process of resource allocation, i.e., assignment, to the Mobile Station Temporary Block Flow (TBF) assignment.

This may be based on quantities like the carriers' MAIO, number of allocated PDCHs per carrier, ARFCN, estimated throughput, or similar.

B. The decision is signaled to the MOBILE STATION 160.

This may be done explicitly or implicitly, by signaling what may be the quantity that may be used to make the decision. Examples may be a ranking based on the number of allocated, i.e., assigned, PDCHs, MAIO number, ARFCN or similar. Further details on the prioritization and signaling maybe found in the sections described below.

C. The MOBILE STATION 160 may use the priority list to select the carriers that should be discarded when receive filter bandwidth is insufficient.

The way to select the carriers is exemplified in the example selection algorithm section, i.e., the carrier/resource selection algorithm for limited filter bandwidth operation, below.

D. The network, e.g., the network node 110 when the network node 110 is one of: the base station 120, the base station controller 140 and the core network node 150, may use the prioritization list and knowledge on mobile station 160 filter BW to avoid wasting radio resources that the MOBILE STATION 160 may not listen to anyway. In this case, the network could e.g. send data to another mobile station if more users are multiplexed on the same radio resources.

Steps A and B can be skipped if both the network and MOBILE STATION 160 already know how the MOBILE STATION 160 shall create the priority list, through e.g. specification.

Example of embodiments of a method in the network node 110 for managing radio resources, will now be described with reference to a flowchart depicted in FIG. 2. The network node 110 is comprised in the wireless radio network 100. The mobile station 160 is configured to operate in the wireless radio network 100. The mobile station 160 has a maximum bandwidth for simultaneous receptions, and a first carrier list comprising carriers. The carriers are radio carriers assigned to the mobile station 160. The maximum bandwidth cannot envelope all the carriers in the first carrier list.

The method comprises the following actions, which actions may be taken in any suitable order. Dashed lines of some boxes in FIG. 2 indicate that the action is not mandatory.

Action 201

This is an optional action. In the embodiments in which the network node 110 is one of: the base station 120, the base station controller 140 and the core network node 150, the network node 110 may receive, from the mobile station 160, the maximum bandwidth supported by the mobile station 160 for simultaneous receptions. The receiving may be implemented, for example by receiving the MOBILE STATION 160 radio access capabilities from the MOBILE STATION 160, or similarly.

Action 202

This is an optional action. In the embodiments in which the network node 110 is one of: the base station 120, the base station controller 140 and the core network node 150, the network node 110 may prioritize the carriers in the first carrier list in a process of resource assignment to the mobile station 160, the prioritizing being based on one or more quantities, and the prioritizing resulting in a decision comprising the priority list.

In some embodiments, the one or more quantities may comprise one of: an explicit list with carriers to prioritize, a MAIO an allocation, i.e., a carrier resource assignment, an ARFCN and an assignment order, i.e., the order in which the carriers have been assigned.

There may be different ways to prioritize the carriers of an allocation as mentioned in B, and in action 202, above. Some prioritization alternatives are outlined here. Alternatives that have impacts to the specification are listed.

1. Explicit List with the Carriers to Prioritize

This alternative corresponds to the embodiments wherein the quantity is an explicit list with carriers to prioritize, e.g. the priority is recited in the list, and may not require further derivation by the mobile station 160.

The network, e.g., the network node 110 when the network node 110 is one of: the base station 120, the base station controller 140 and the core network node 150, may signal a complete list of carriers to prioritize, i.e., the first carrier list. If the resource allocation, i.e., assignment, is in accordance with the description above, the difference between the carriers may be in the allocated MAIO value, and thus a priority list may relate to the assigned MAIOs. In addition, also a non-hopping channel may be part of the multi-carrier assignment, in which case only the fixed ARFCN may be known to the mobile station 160, i.e., no HSN, MA or MAIO may be provided. In this case, the non-hopping channel may also need to be included in the prioritization list signaled to the mobile station 160.

In one example, MAIOs=[0,1,2] may be assigned to a mobile station 160 with three carriers. The prioritization list may be [2,3,1], indicating that the carrier assigned MAIO=2 has the highest priority.

In another example, MAIOs=[0,1,2] and a non-hopping channel using ARFCN=10 may be assigned to a mobile station 160 with three carriers, i.e. a total of four carriers are assigned to the mobile station 160. The prioritization list may be [4 (non-hopping),2,3,1], indicating that the carrier assigned MAIO=2 has the highest priority. The non-hopping channel, if present, may be assigned a known position in the prioritization list.

2. MAIO Based Prioritization

This alternative corresponds to the embodiments wherein the quantity is a MAIO.

Considering the frequency hopping functionality described above, it is clear that assigning consecutive MAIO values for the carriers may assert a minimum inter-carrier spread in frequency, given that the MA is longer than the number of MAIOs/carriers, i.e., that wrap-around effects due to the modulus operation above is to the largest extent avoided.

Thus, it may be assumed that, in the vast majority of assignments, it is not beneficial, from a bandwidth/frequency perspective, to set low priority to MAIOs in the middle of the list. A simple approach may thus be for the network and MOBILE STATION 160 to prioritize the carriers based on MAIO value, and discard carriers starting either from the highest or lowest assigned MAIO value. That is, in these embodiments, the prioritization may be implicitly derived from the MAIO, i.e., no new information more than legacy functionality may be provided, i.e., signaled to the mobile station 160.

This approach may also be supported when a non-hopping channel is allocated to the mobile station 160, as long as the prioritization is clear to both mobile station 160 and network. For example, the non-hopping channel may always be assigned the lowest or highest priority.

For example, MAIOs=[0,1,2] is assigned a mobile station 160 with three carriers. This implicitly indicates to both network and mobile station 160 that the prioritization list to use is [1,2,3]

Figure 3:
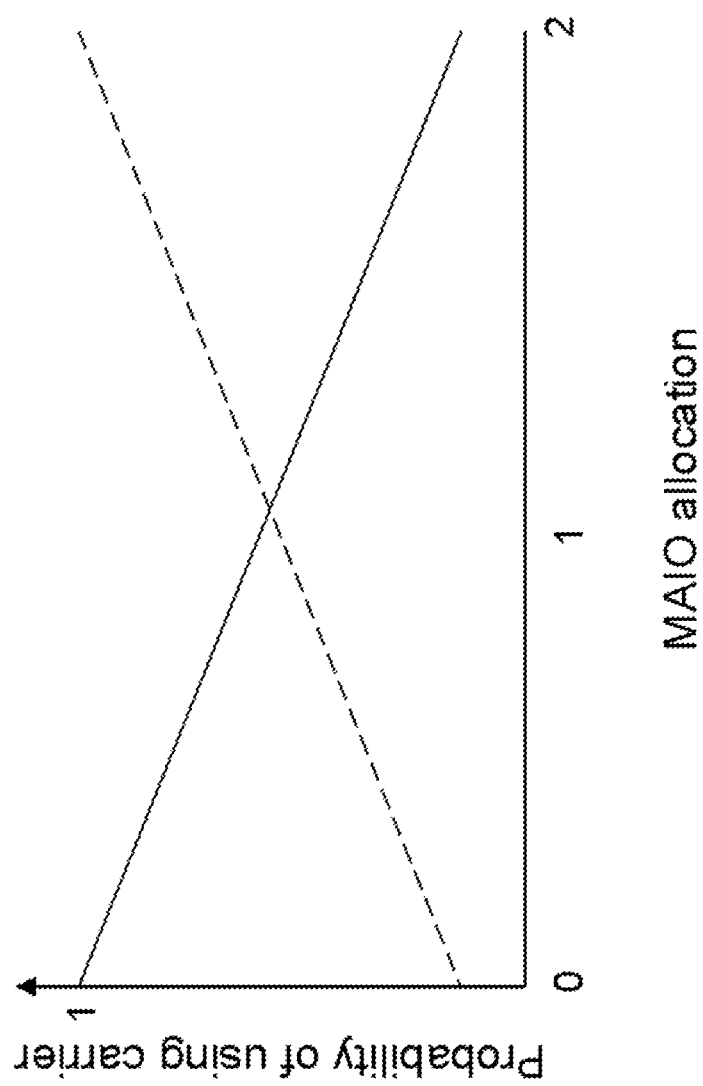
FIG. 3 is a graphical representation depicting embodiments of MAIO based prioritization, according to some embodiments.

To add further flexibility to the MAIO based prioritization, it may be signaled with a single bit whether or not a reversed MAIO order should be used, i.e., '0' indicates that MAIO with lowest value is discarded first, while '1' indicates that MAIO with the highest value is discarded first. Assuming that several mobile stations are allocated the same MAIOs, HSN and MA and they are allocated the same number of carriers, and radio resources on each carrier, providing different MAIO orders may ensure more efficient resource utilization. This principle is illustrated in FIG. 3, which will be described below.

In another example, MAIOs=[0,1,2] is assigned a mobile station 160 with three carriers, and "MAIO order" is set to '1'. This indicates to both network and mobile station 160 that the prioritization list is [3,2,1].

3. Allocation, i.e., Carrier Resource Assignment, Based Prioritization

This alternative corresponds to the embodiments wherein the quantity is an allocation, i.e., based on the amount of resources assigned to each carrier.

In the MAIO based allocation, i.e., assignment, prioritization is only considered based on frequency allocation of the assigned carriers. However, the network may, based on the signaled mobile station 160 multislot class, allocate, i.e., assign, the mobile station 160 to a number of Time Slots (TS) per carrier within each TDMA frame. The network may then in each radio block period schedule the mobile station 160 at most on all allocated, i.e., assigned, TS, and the mobile station 160 may need to be ready to process each allocated, i.e., assigned, TS on the carrier received. In particular, for the downlink dual carrier feature, and also foreseen for the multicarrier feature, the mobile station 160 may signal a number of TS to reduce from the maximum number derived from the multislot class signaled. For example, if the mobile station 160 signals a multislot class indicating it can receive 4 TS on the 3 assigned carriers in the DL, and at the same time it signals a timeslot reduction of 3, see 3GPP TS 45.002, for example, version 10.3.0, "Multiplexing and multiple access on the radio path", Annex B. This in effect means that the network may be only allowed to allocate at most 4*3−3=9 TS to the mobile station 160 on the DL. Thus, disregarding other aspects, such as other allocations, i.e., assignments, in the cell, the network may be forced to have an asymmetric allocation, i.e., assignment, of TS to the mobile station 160 on different carriers. Disregarding other aspects, such as multiplexing rate of the resource it may thus be beneficial to prioritize the carriers based on the current allocation, i.e., assignment, which may ensure that carriers with less number of TS allocated, i.e., assigned, may be discarded first. It may be noted that the prioritization order with this approach may be changed during a data session without explicit signaling to the mobile station 160, i.e. when the resources are re-allocated, the prioritization order subsequently changes as well. That is, in the embodiments wherein the quantity is an allocation, i.e., assignment, the prioritization is based on the number of TS assigned on each carrier, and the prioritization may be implicitly derived from the allocation, i.e., assignment, that is, no new information more than legacy functionality may be provided, e.g., signaled to the mobile station 160.

For example, MAIOs=[0,1,2] is assigned a mobile station 160 with three carriers. For each MAIO, the following number of TSs are allocated, i.e., assigned, to the mobile station 160, e.g., for the respective carrier [4,3,2]. This may implicitly indicate to the network, e.g., the network node 110 when the network node 110 is one of: the base station 120, the base station controller 140 and the core network node 150, that the prioritization list is [1,2,3].

4. Starting ARFCN Based Prioritization

This alternative corresponds to the embodiments wherein the quantity is an ARFCN.

MAIO may not unambiguously identify carriers, since the network may have configured carriers to hop with different sets of carrier frequencies and then MAIO may be reused. In that case, an option may be to prioritize the carriers based on a specific ARFCN in the hopping sequence, e.g. by assuming HSN(Frame Number (FN))=0 in the equation shown above. Similarly, one may prioritize based on ascending or descending value. That is, in these embodiments, the prioritization may be based according to the ARFCNs used by the assigned carriers at a pre-defined FN, and the prioritization may be implicitly derived from the ARFCN, i.e., no new information more than legacy functionality may be provided, e.g., signaled to the mobile station 160.

For example, two hopping sets are defined, MA1 and MA2, together with a non-hopping frequency. MA1={2,6, 9,12}, MA2={15,17,19}, the non-hopping frequency, ARFCN=25.

Assuming a mobile station 160 is allocated, i.e., assigned, MAIO=[0,1] in MA1, and MAIO=[2] in MA2, the resulting prioritization order is (assuming HSN(FN)=0 in the equation in 6.1) [2,6,19,25]. The list may be prioritized in ascending or descending order.

5. Allocation, i.e., Assignment, Order Based Prioritization

This alternative corresponds to the embodiments wherein the quantity is an assignment order.

Yet another option is to prioritize the carriers based on the order they were assigned, either with ascending or descending priority. That is, in these embodiments, the prioritization may be implicitly derived from the assignment order, i.e., no new information more than legacy functionality may be provided, e.g., signaled to the mobile station 160.

Other prioritization alternatives than the ones listed above may be used. It may also be noted that they may be combined. For example, if the Allocation, i.e., the carrier resource assignment, based prioritization is used, and several carriers have the same TS allocation, the one with the lowest/highest MAIO can be discarded first.

Action 203

This is an optional action. In the embodiments in which the network node 110 is one of: the base station 120, the base station controller 140 and the core network node 150, the network node 110 may signal the priority list to the mobile station 160, implicitly or explicitly, as described above.

The prioritization method may be explicitly signaled to the mobile station 160 at Temporary Block Flow (TBF) setup, and modifications to the prioritization may be signaled during TBF using the Packet Associated Control Channel (PACCH) channel. Alternatively, a re-defined Piggy-Backed Ack/Nack (PAN) may be used that may be transmitted simultaneously with the data block or modified Radio Link Control/Medium Access Control (RLC/MAC) header. Another option may be to broadcast the strategy in the System Information.

Action 204

This is an optional action. In this action, the network node 110 may calculate that the maximum bandwidth of the mobile station 160 cannot envelope all the carriers in the first carrier list. This may be implemented, for example by the example algorithm described further down.

Action 205

The network node 110 removes one or more carriers from the first carrier list, which removing of the one or more carriers is performed, one carrier by one carrier, until the maximum bandwidth can envelope all remaining carriers after the removing, the one or more removed carriers having a lowest priority according to the priority list. This may be implemented, for example by the example algorithm described further down.

In some embodiments, the removing one or more carriers from the first carrier list may further comprise removing one carrier from the first carrier list, the removed carrier having the lowest priority according to the priority list, wherein the removing one carrier results in a reduced carrier list comprising all remaining carriers after the removing the carrier having the lowest priority.

In some of these embodiments, the removing one or more carriers from the first carrier list may further comprise calculating if the maximum bandwidth of the mobile station 160 can envelope all the remaining carriers in the reduced carrier list. When the maximum bandwidth of the mobile station 160 cannot envelope all the remaining carriers in the reduced carrier list, the removing one or more carriers from the first carrier list may further comprise, removing one or more further carriers having a lowest priority from the reduced carrier list, one by one, until the network node 110 calculates that the maximum bandwidth can envelope all the remaining carriers after the removing the one or more further carriers.

The remaining carriers, as described in the next action, comprise carriers to receive for the mobile station 160.

Action 206

This is an optional action. In this action, the network node 110 may determine, when the maximum bandwidth can envelope all the remaining carriers after the removing one or more carriers, that all the remaining carriers after the removing one or more carriers comprise carriers to receive for the mobile station 160. This may be implemented, for example by the example algorithm described further down.

In the embodiments in which the network node 110 is one of: the base station 120, the base station controller 140 and the core network node 150, the network node 110 may determine, when the maximum bandwidth can envelope all the remaining carriers after the removing one or more carriers, that all the remaining carriers after the removing one or more carriers comprise carriers possible for the network node 110 to allocate to the mobile station 160.

In some embodiments wherein the carriers assigned to the mobile station 160 are assigned for a plurality of bursts in a radio block period, e.g., four bursts, the plurality of bursts comprising a first burst and one or more additional bursts, the calculating, the removing and the determining may be performed for the first burst and then performed for each of the one or more additional bursts. In some embodiments, the plurality of bursts in the radio block period is four bursts.

Action 207

This is an optional action. In some embodiments wherein the network node 110 is the mobile station 160, the network node 110 may disable radio reception on one or more time slots associated with the removed carrier. This may be implemented, for example by the following example algorithm.

FIG. 3, referred to above, is a graphical representation depicting embodiments of MAIO based prioritization, according to some embodiments. The Figure represents the probability of using a certain carrier based on the MAIO allocation for a first mobile station, MS1, such as the mobile station 160, and a second mobile station, MS2, such as the mobile station 160, wherein the MS1 and MS2 are provided different MAIO orders. MS1, which is represented with a continuous line, uses normal order, and MS2, which is represented with a dashed line, uses reversed order.

Non-Limiting Example Selection Algorithm

One possible way to implement the procedure in the network node 110 described above is presented below, also depicted in FIG. 4.

Action 401. The network node 110 may read the BW of the mobile station 160 "MS Bandwidth", the priority list and the carrier list.

Action 402. The network node 110 may calculate if the receive BW of the mobile station 160 "MS receive BW" can envelope all carriers in the carrier list, for the upcoming block period.

Action 403. The network node 110 may determine if the receive BW of the mobile station 160 was successful in enveloping all carriers in the carrier list. In some embodiments, this action may correspond to action 206.

Action 404. When the network node 110 may determine that the receive BW of the mobile station 160 was not successful in enveloping all carriers in the carrier list, the network node 110 removes the carrier from the carrier list that has the lowest priority, according to the priority list. The network node 110 may then repeat the calculating step with the carrier list wherein the carrier has been removed.

Action 405. When the network node 110 may determine that the receive BW of the mobile station 160 was successful in enveloping all carriers in the carrier list, the network node 110, in the embodiments in which the network node is the mobile station 110, may proceed with radio reception on the remaining carriers in the carrier list.

Every time the network node 110 may determine that the receive BW of the mobile station 160 was not successful in enveloping all carriers in the carrier list, i.e., whenever the answer to the "Successful?" question is a no, the network node 110 may repeat the removing (404) and the calculating (402) actions until the network node 110 may determine that the receive BW of the mobile station 160 was successful in enveloping all carriers in the carrier list. That is, the algorithm may loop through the removing (404), calculating (402) and determining (403) actions until the network node 110 may determine that the receive BW of the mobile station 160 was successful in enveloping all carriers in the carrier list, i.e., whenever the answer to the "Successful?" question is a yes.

The MOBILE STATION 160 may determine if it may receive all four bursts on all allocated, i.e., assigned, carriers for an upcoming radio block period.

Starting with the first burst, the network node 110 may:

1. Decision: Are the carriers for the burst within the mobile station 160 receive BW?

If no, i) Disable carrier with lowest priority, ii) Remove carrier from further consideration in upcoming decisions for this radio block period, e.g., in bursts. Disable radio reception on the timeslots associated with the carrier.

ii) Go to 1 and revisit the decision for this burst.

If yes,

Alternative 1:

i) Go to 1 and make the decision for the next burst. If no more bursts to consider, go to step 2.

2. Done: Receive on the allocated resources, i.e., all of the bursts of the assigned resources, on the carriers that have not been disabled.

Alternative 2:

i) Receive on the allocated, i.e., assigned, resources on the carriers that have not been disabled. Go to 1 and make the decision for the next burst. If no more bursts to consider, go to step 2.

2. Done.

Embodiments according to alternative 1 and embodiments according to alternative 2 are similar, but with the difference that alternative 1 pre-calculates what bursts to receive for the full radio block period, while alternative 2 distributes this calculation for each separate burst. This may be useful in mobile station receiver implementations that limit inter-burst relations. Alternative 1 may allow a narrower carrier selection filter that only envelopes the carriers to receive in all bursts. Also, some unnecessary burst reception attempts may be avoided, since it is known already in the beginning of the radio block period that, for some carriers, it may not be possible to receive all bursts.

Non-Limiting Algorithm Output Example

Below is an example on how the algorithm described above may work on three carriers ranked in descending order and a mobile station 160 receive BW of 30 channels, in embodiments wherein the plurality of bursts in a radio block period is four bursts.

Burst 1

Carrier 1 is at ARFCN=$^{10}$, Carrier 2 is at ARFCN=30 and Carrier 3 is at ARFCN=50.

Is min([10,30,50])−max([10,30,50])<30 (No)?

Disable carrier with lowest priority, i.e. carrier 3.

Is min([10,30])−max([10,30])<30 (Yes)?

Proceeding to burst 2

Burst 2: Carrier 1 is at ARFCN=5, Carrier 2 is at ARFCN=25 and Carrier 3 is not considered since it has been disabled.

Is min([5,25])−max([5,25])<30 (Yes)?

Proceeding to burst 3

Burst 3: Carrier 1 is at ARFCN=50, Carrier 2 is at ARFCN=40 and Carrier 3 is not considered since it has been disabled.

Is min([50,40])−max([50,50])<30 (Yes)?

Proceeding to burst 4

Burst 4: Carrier 1 is at ARFCN=55, Carrier 2 is at ARFCN=10 and Carrier 3 is not considered since it has been disabled.

Is min([55,10])−max([55,10])<30 (No)?

Disable remaining carrier with lowest priority, i.e. carrier 2.

Is min([55])−max([55])<30 (Yes)?

All bursts considered, proceed with reception on carrier 1 only. Done.

Example of embodiments of a method in the mobile station 160 for managing radio resources, will now be described with reference to a flowchart depicted in FIG. 5. The mobile station 160 is configured to operate in the wireless radio network 100. The mobile station 160 has the maximum bandwidth for simultaneous receptions, and the first carrier list comprising carriers. The carriers are radio carriers assigned to the mobile station 160. The maximum bandwidth cannot envelope all the carriers in the first carrier list.

The method comprises the following actions, which actions may be taken in any suitable order. Dashed lines of some boxes in FIG. 5 indicate that the action is not mandatory.

Action 501

This is an optional action. In this action, the mobile station 160 may send to the network node 110 the maximum bandwidth supported by the mobile station 160 for simultaneous receptions, wherein the network node 110 is one of: the base station 120, the base station controller 140 and the core network node 150. This may be implemented, for example by sending the mobile station 160 radio access capabilities to the network node 110.

Action 502

This is an optional action. The mobile station 160 may obtain the priority list of carriers from the network node 110 comprised in the wireless radio network 100, wherein the network node 110 is one of: the base station 120, the base station controller 140 and the core network node 150, implicitly or explicitly, wherein the carriers in the carrier list have been prioritized by the network node 110, as described earlier in relation to action 202, in a process of resource assignment to the mobile station 160, the prioritizing being based on one or more quantities, wherein the one or more quantities comprise one of: the explicit list with carriers to prioritize, the MAIO the allocation, the ARFCN and the carrier assignment order. The obtaining may be implemented as described earlier in relation to action 203.

Action 503

This is an optional action. In this action, the mobile station 160 may calculate that the maximum bandwidth of the mobile station 160 cannot envelope all the carriers in the first carrier list. This may be implemented as described earlier in relation to action 204.

Action 504

The mobile station 160 removes one or more carriers from the first carrier list, which removing of the one or more carriers is performed, one carrier by one carrier, until the maximum bandwidth can envelope all remaining carriers after the removing, the one or more removed carriers having the lowest priority according to the priority list. This may be implemented as described earlier in relation to action 205.

In some embodiments, the removing one or more carriers from the first carrier list may further comprise removing one carrier from the first carrier list, the removed carrier having the lowest priority according to the priority list, wherein the removing one carrier results in the reduced carrier list comprising all remaining carriers after the removing the carrier having the lowest priority.

In some of these embodiments, the removing one or more carriers from the first carrier list may further comprise calculating if the maximum bandwidth of the mobile station 160 can envelope all the remaining carriers in the reduced carrier list. When the maximum bandwidth of the mobile station 160 cannot envelope all the remaining carriers in the reduced carrier list, the removing one or more carriers from the first carrier list may further comprise, removing one or more further carriers having the lowest priority from the reduced carrier list, one by one, until the network node 110 calculates that the maximum bandwidth can envelope all the remaining carriers after the removing the one or more further carriers.

The remaining carriers, as described in the next action, comprise carriers to receive for the mobile station 160.

Action 505

This is an optional action. In this action, the mobile station 160 may determine, when the maximum bandwidth can envelope all the remaining carriers after the removing 205 one or more carriers, that all the remaining carriers after the removing 205 one or more carriers comprise carriers to receive for the mobile station 160. This may be implemented as described earlier in relation to action 206.

Action 506

This is an optional action. In this action, the mobile station 160 may disable radio reception on one or more time slots associated with the removed carrier. This may be implemented as described earlier in relation to action 207.

Action 507

The mobile station 160 proceeds with radio reception on the determined carriers. This may be implemented, for example by receiving the Radio Link Control (RLC) Protocol Data Units (PDUs) carried by the radio blocks on the radio resources.

In some embodiments, wherein the carriers assigned to the mobile station 160, are assigned for the plurality of bursts in the radio block period, e.g., four bursts, the plurality of bursts comprising the first burst and one or more additional bursts, the calculating, the removing and the determining may be performed for the first burst and then performed for each of the one or more additional bursts. In these embodiments, the proceeding may be performed after the calculating, the removing and the determining have been performed for all the bursts in the plurality of bursts. In some embodiments, the plurality of bursts in the radio block period is four bursts.

Figure 2:
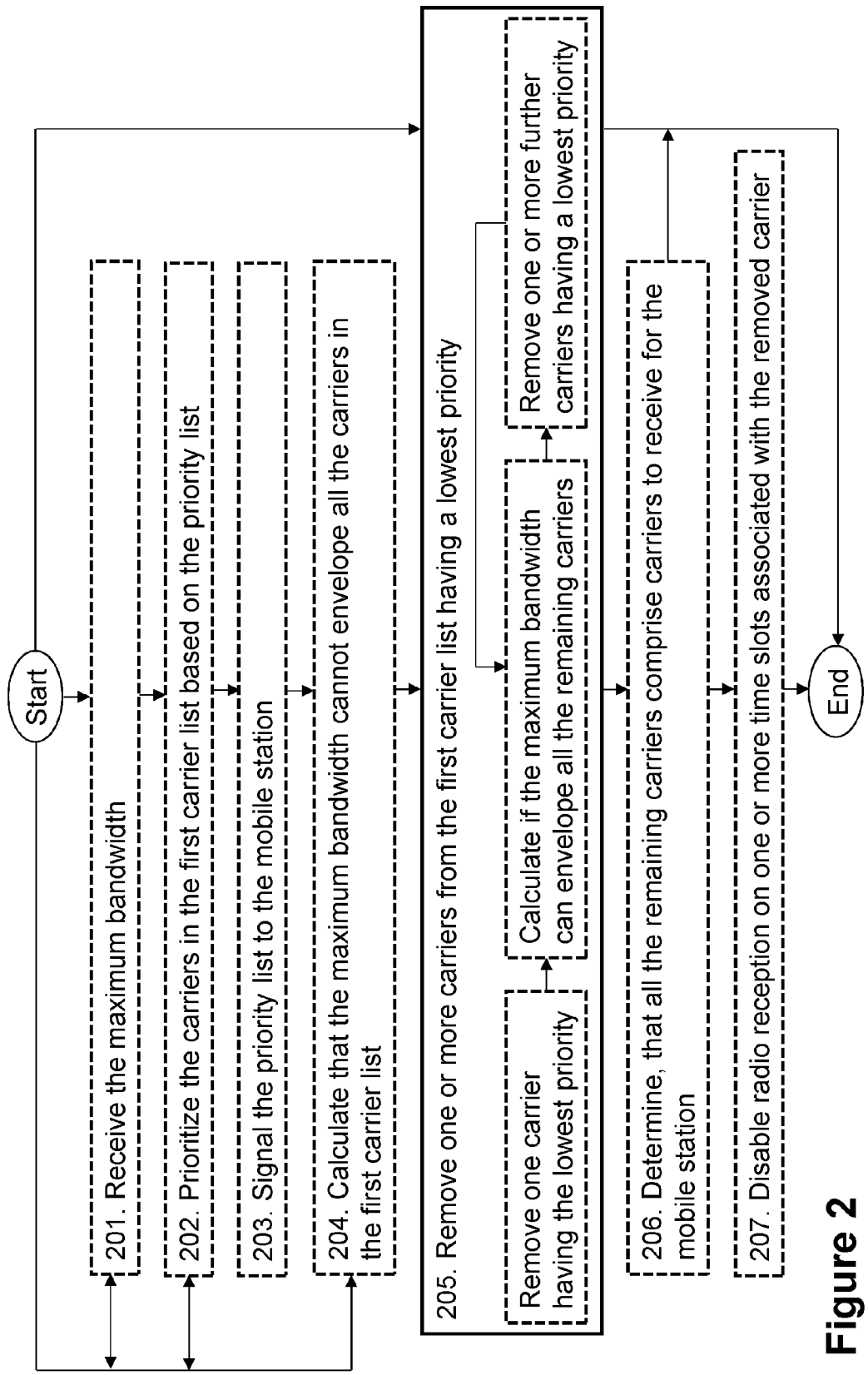
FIG. 2 is a flowchart depicting embodiments of a method in the network node, according to some embodiments.
Figure 4:
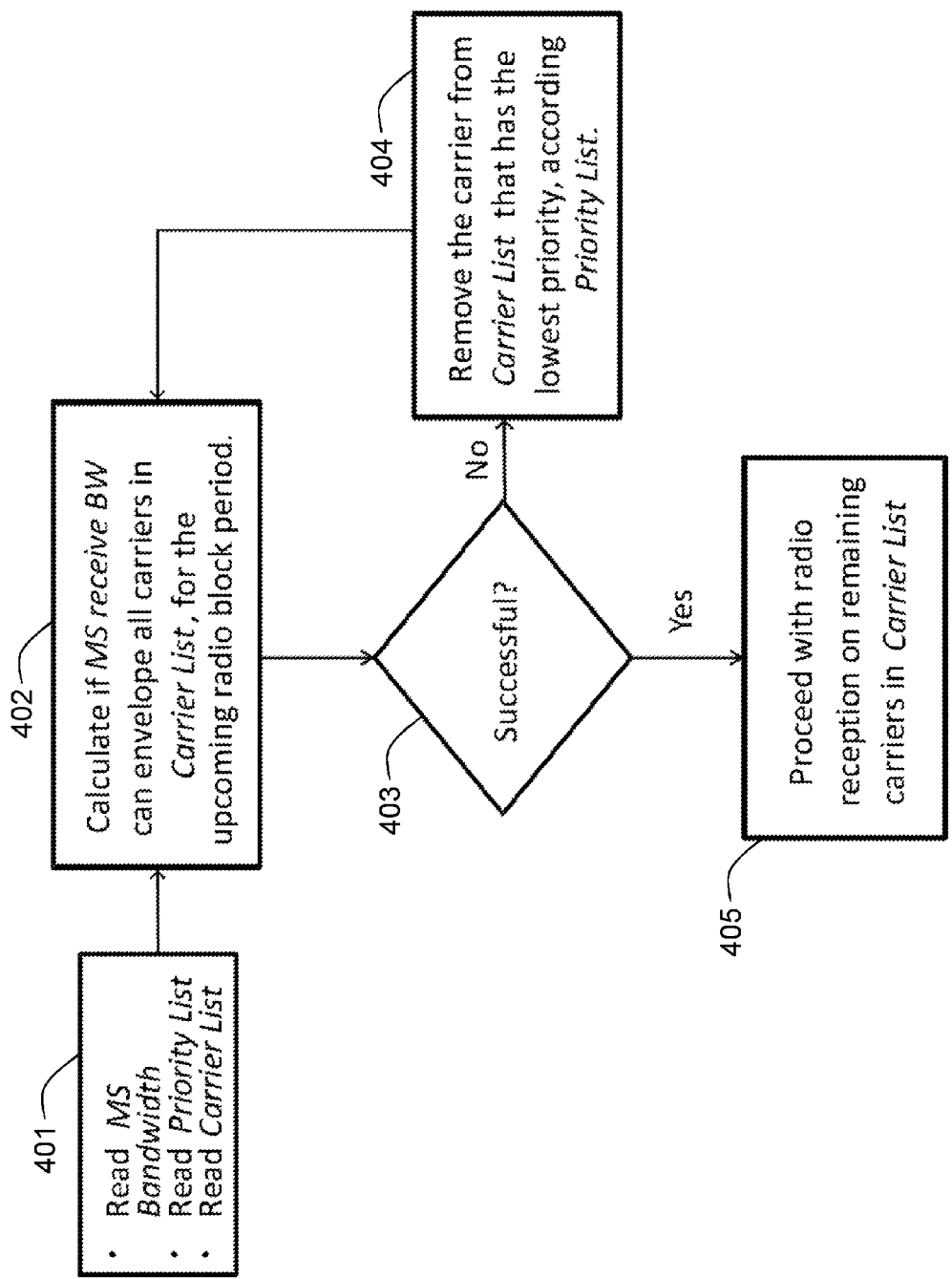
FIG. 4 is a flowchart depicting embodiments of an implementation of a method in a network node in an example selection algorithm, according to some embodiments.
Figure 5:
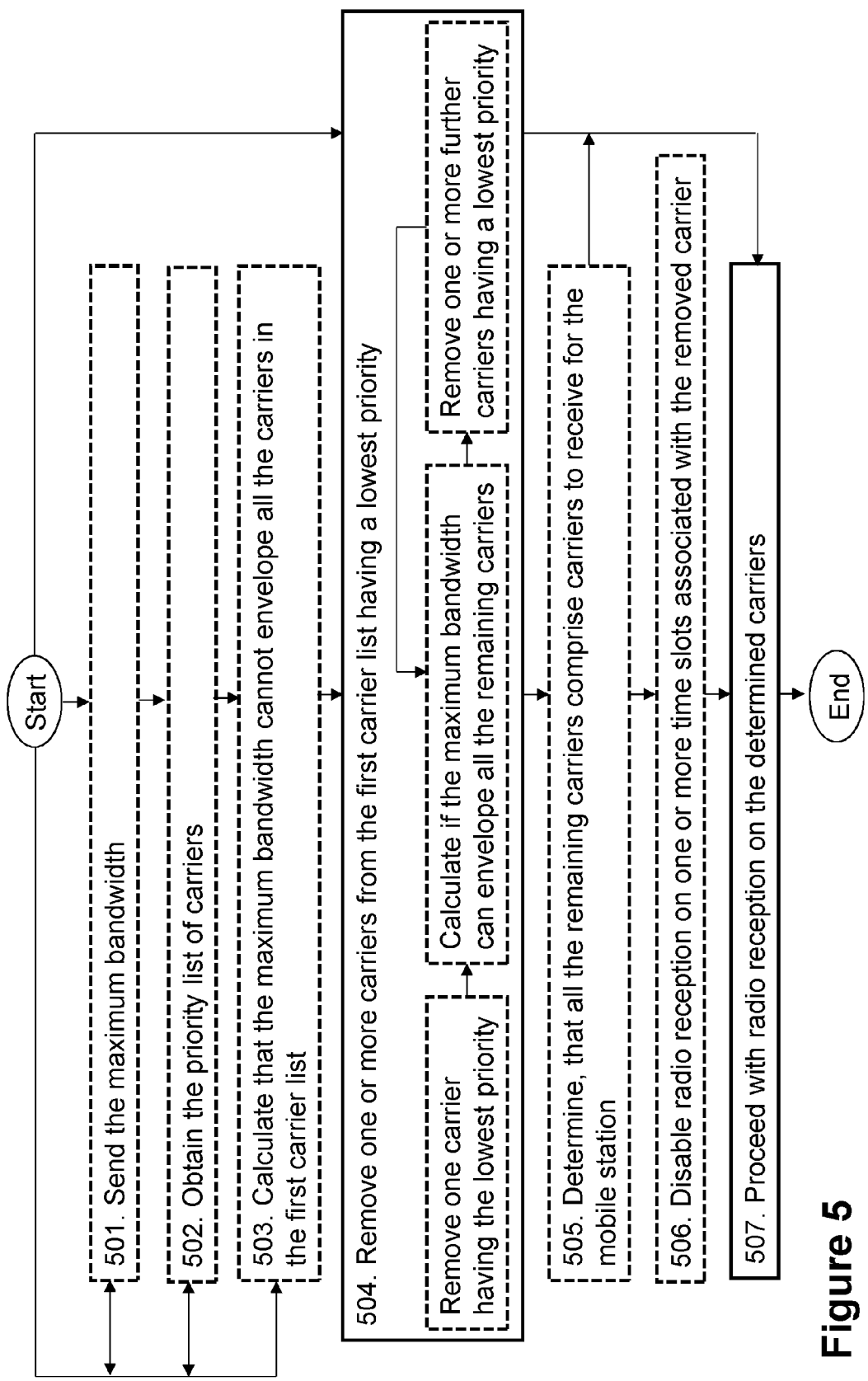
FIG. 5 is a flowchart depicting embodiments of a method in the mobile station, according to some embodiments.

When faced with the problem of what carriers to receive when the receive bandwidth of the mobile station 160 is limited, the described embodiments of method in relation to FIGS. 2 and 4-5, with a list of prioritized carriers, has the following advantages:

The network node 110 when the network node 110 is one of: the base station 120, the base station controller 140 and the core network node 150, may, in a straight-forward way, adapt the radio resource allocation in the cell, e.g., in the cell 130 towards the priority lists that the mobile stations, such as the mobile station 160, use. To further optimize, the network node 110 may assign different priority lists to the different mobile stations, such as the mobile station 160.

The described embodiments of the method in relation to FIGS. 2 and 4-5 may ensure that a specific carrier may always be received. This is not the case if an optimized prioritization based only on maximizing the carrier number is used. The guaranteed reception of a specific carrier enables the use of, for example, the paired carrier on the UL. It may also ease the implementation of an embodiment, e.g., DL Multi-Carrier (DLMC) functionality that is based on, i.e., that relies on, a defined prioritized carrier.

The described embodiments of the method in relation to FIGS. 2 and 4-5 may, in a simple manner, indicate to the network what carrier may be received, e.g., by the mobile station 160. This may ease the implementation of DL scheduling, and allocation of other mobile stations in a multiplexing scenario.

Figure 6:
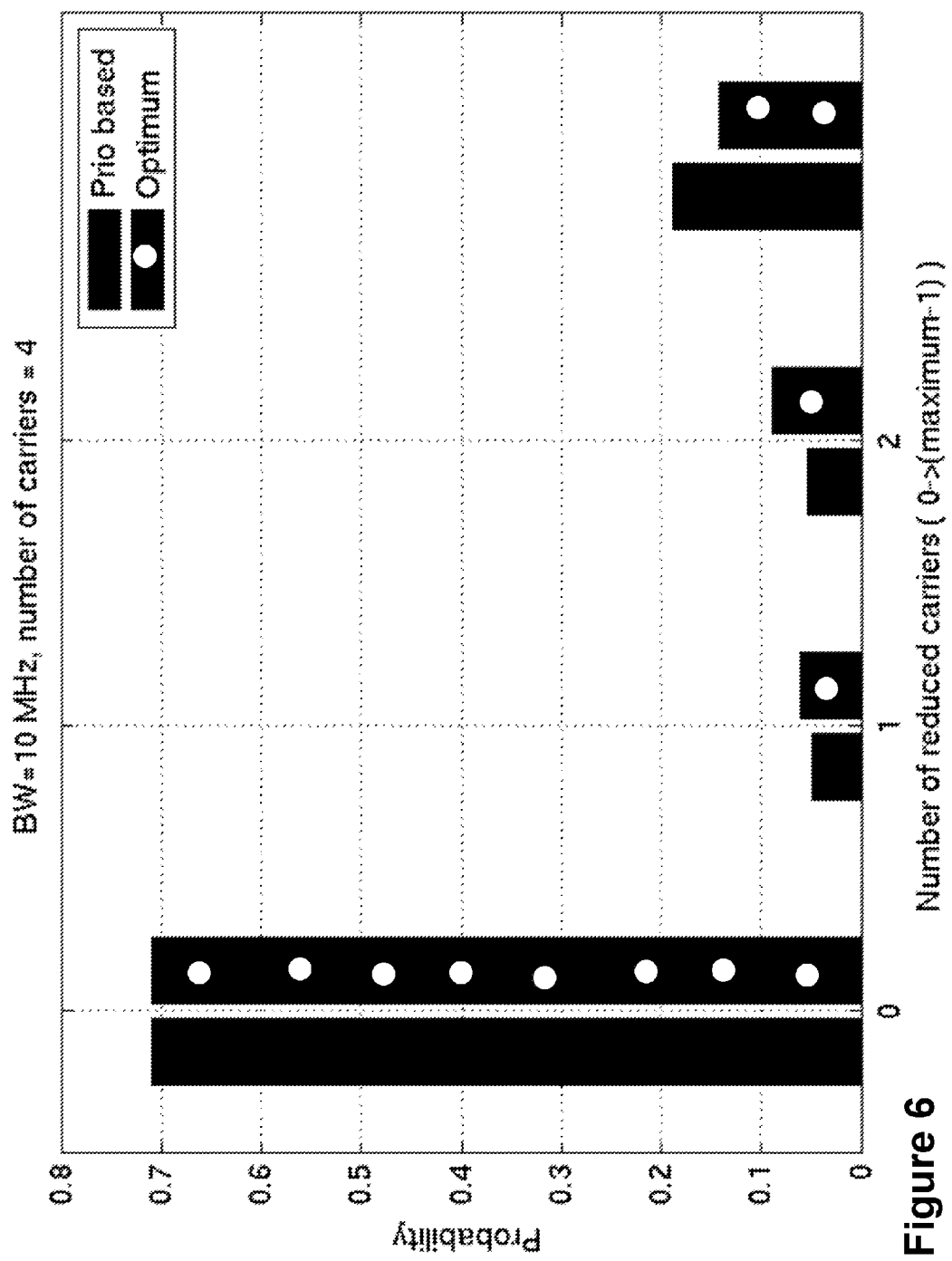
FIG. 6 is a graphical representation depicting embodiments of an analysis on number of reduced carriers due to MS BW restrictions from collected real network data, according to some embodiments.

Apart from the advantages mentioned above, the described embodiments of method in relation to FIGS. 2 and 4-5 may be compared to using an optimized choice for each data block based on collected statistics from a real network deployment. The result is shown in FIG. 6. FIG. 6 is a graphical representation depicting embodiments of an analysis on number of reduced carriers due to MS BW restrictions from collected real network data, according to some embodiments. The figure shows the probability of the number of carriers, "Probability" axis, that may need to be discarded due to bandwidth limitations at the mobile station 160, "Number of reduced carriers (0→(maximum−1))" axis. The example provided is for a BW=10 MHz and a number or carriers=4. The Figure shows a comparison between an optimized procedure, and the priority-based proposed method described herein. In the optimized procedure, which is represented by dotted black bars and labelled as "Optimum", each carrier combination is investigated to determine the one that maximizes the number of carriers received. The priority-based proposed method herein is represented by solid black bars and is labelled as "Prio based". The result shown in the Figure indicates that there is close resemblance between the optimized procedure and the proposed method.

Figure 7:
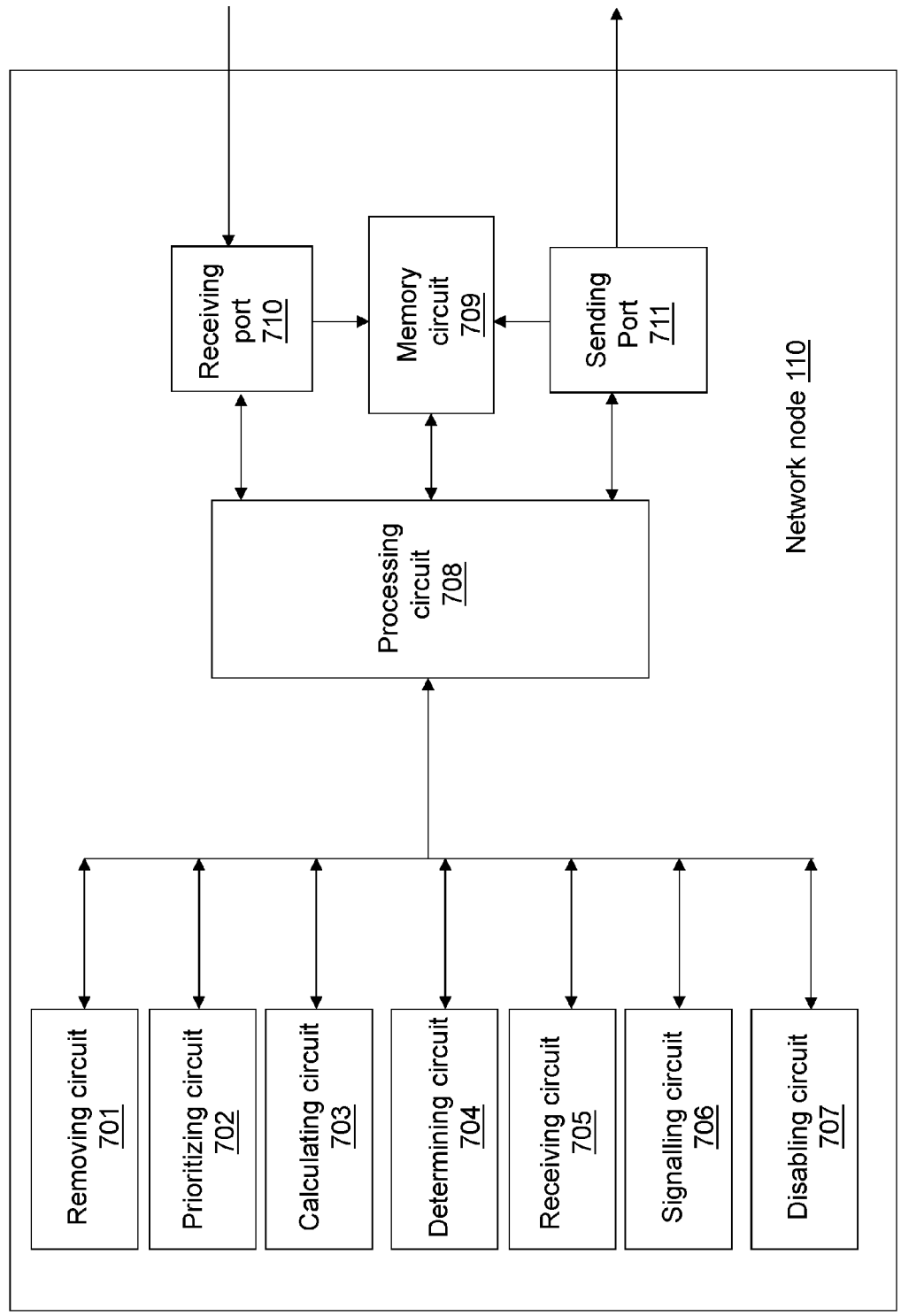
FIG. 7 is a block diagram of the network node that is configured according to some embodiments.

To perform the method actions in the network node 110 described above in relation to FIG. 2 for managing radio resources, the network node 110 comprises the following arrangement depicted in FIG. 7. The network node 110 is configured to be comprised in the wireless radio network 100. The mobile station 160 is configured to operate in the wireless radio network 100 has the maximum bandwidth for simultaneous receptions and the first carrier list comprising carriers, wherein the carriers are radio carriers assigned to the mobile station 160, and wherein the maximum bandwidth cannot envelope all the carriers in the first carrier list.

The detailed description of some of the following features corresponds to the same description provided above, in relation to the actions described for the network node 110, and will thus not be repeated here.

The network node 110 comprises a removing circuit 701 configured to remove one or more carriers from the first carrier list, wherein to remove the one or more carriers is configured to be performed, one carrier by one carrier, until the maximum bandwidth can envelope all remaining carriers after the removing, the one or more removed carriers having the lowest priority according to the priority list. The remaining carriers comprise carriers to receive for the mobile station 160.

In some embodiments, to remove one or more carriers from the first carrier list may further comprise to remove one carrier from the first carrier list, the removed carrier having the lowest priority according to the priority list, wherein to remove one carrier is configured to result in the reduced carrier list comprising all remaining carriers after the removing the carrier having the lowest priority.

In some of these embodiments, to remove one or more carriers from the first carrier list may further comprise to calculate if the maximum bandwidth of the mobile station 160 can envelope all the remaining carriers in the reduced carrier list. When the maximum bandwidth of the mobile station 160 cannot envelope all the remaining carriers in the reduced carrier list, to remove one or more carriers from the first carrier list may further comprise to remove one or more further carriers having the lowest priority from the reduced carrier list, one by one, until the network node 110 calculates that the maximum bandwidth can envelope all the remaining carriers after the removing the one or more further carriers.

In some embodiments, the network node 110 may also comprise a prioritizing circuit 702 configured to prioritize the carriers in the first carrier list in the process of resource assignment to the mobile station 160, wherein to prioritize is based on one or more quantities, and to prioritize results in a decision comprising the priority list.

In some embodiments, the one or more quantities may comprise one of: the explicit list with carriers to prioritize, the Mobile Allocation Index Offset, MAIO, the allocation, the Absolute Radio Frequency Channel Number, ARFCN, and the assignment order.

In some embodiments, the network node 110 may also comprise a calculating circuit 703 configured to configured to calculate that the maximum bandwidth of the mobile station 160 cannot envelope all the carriers in the first carrier list.

In some embodiments, the network node 110 may also comprise a determining circuit 704 configured to determine, when the maximum bandwidth can envelope all the remaining carriers after the removing one or more carriers, that all the remaining carriers after the removing one or more carriers comprise carriers to receive for the mobile station 160.

In the embodiments in which the network node 110 is one of: the base station 120, the base station controller 140 and the core network node 150, the network node 110 may comprise a receiving circuit 705 configured to receive from the mobile station 160 the maximum bandwidth supported by the mobile station 160 for simultaneous receptions.

In the embodiments in which the network node 110 is one of: the base station 120, the base station controller 140 and the core network node 150, the network node 110 may comprise a signalling circuit 706 configured to signal the priority list to the mobile station 160, implicitly or explicitly.

In some embodiments, in which the network node 110 is the mobile station 160, the network node 110 may comprise a disabling circuit 707 configured to disable radio reception on one or more time slots associated with the removed carrier.

In some embodiments, wherein the carriers assigned to the mobile station 160, are assigned for the plurality of bursts in the radio block period, the plurality of bursts comprising the first burst and one or more additional bursts, and wherein to calculate, to remove one or more carriers from the first carrier list and to determine are configured to be performed for the first burst and then configured to be performed for each of the one or more additional bursts, and wherein to proceed is configured to be performed after the to calculate, to remove one or more carriers from the first carrier list, and the to determine have been performed for all the bursts in the plurality of bursts.

The embodiments herein for managing radio resources in the network node 110 may be implemented through one or more processors, such as a processing circuit 708 in the network node 110 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It may be however feasible with other data carriers such as a memory stick. The computer program code may furthermore be provided as pure program code on a server and downloaded to the network node 110.

The network node 110 may further comprise a memory circuit 709 comprising one or more memory units. The memory circuit 709 may be arranged to be used to store data such as, information removed, prioritized, calculated, determined, received and/or signalled, by the processing circuit 708 in relation to applications to perform the methods herein when being executed in the network node 110. Memory circuit 709 may be in communication with the processing circuit 708. Any of the other information processed by the processing circuit 708 may also be stored in the memory circuit 709.

In some embodiments, information such as the maximum bandwidth supported by the mobile station 160 for simultaneous receptions may be received through a receiving port 710. In some embodiments, the receiving port 710 may be, for example, connected to the one or more antennas in the network node 110. In other embodiments, the network node 110 may receive information from another structure in the wireless radio network 100 through the receiving port 710. Since the receiving port 710 may be in communication with the processing circuit 708, the receiving port 710 may then send the received information to the processing circuit 708. The receiving port 710 may also be configured to receive other information.

The information removed, prioritized, calculated, determined, received and/or signalled by the processing circuit 708 in relation to the method disclosed herein, may be stored in the memory circuit 709 which, as stated earlier, may be in communication with the processing circuit 708 and the receiving port 710.

The processing circuit 708 may be further configured to signal information, such as the priority list to the mobile station 160, through a sending port 711, which may be in communication with the processing circuit 708, and the memory circuit 709.

Those skilled in the art will also appreciate that the removing circuit 701, the prioritizing circuit 702, the calculating circuit 703, the determining circuit 704, the receiving circuit 705 and the signalling circuit 706 described above may refer to a combination of analog and digital circuits, and/or one or more processors configured with software and/or firmware (e.g., stored in memory) that, when executed by the one or more processors such as the processing circuit 708, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
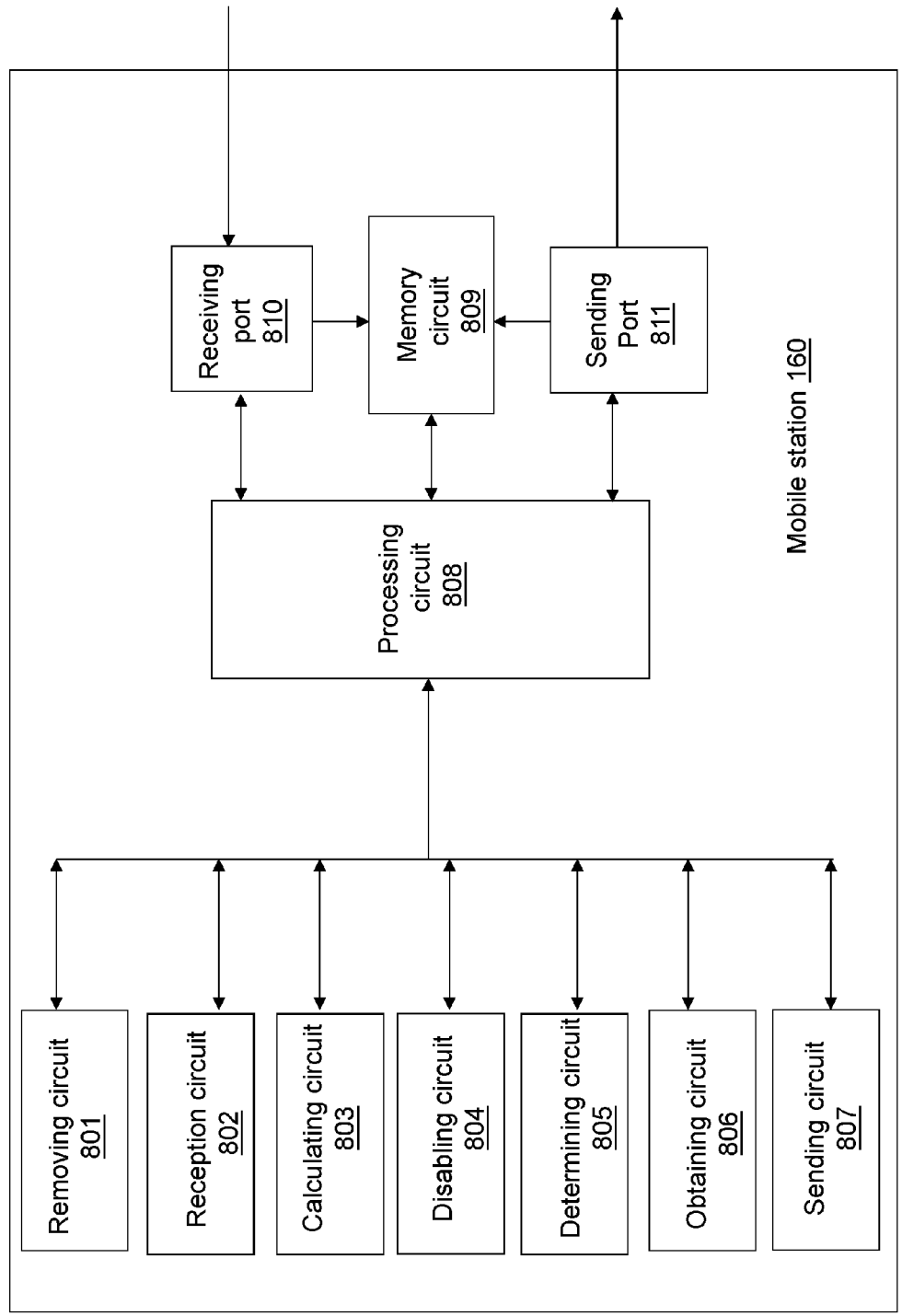
FIG. 8 is a block diagram of the mobile station that is configured according to some embodiments.

To perform the method actions in the mobile station 160 described above in relation to FIG. 5 for managing radio resources, the mobile station 160 comprises the following arrangement depicted in FIG. 8. The mobile station 160 is configured to operate in the wireless radio network 100. The mobile station 160 has the maximum bandwidth for simultaneous receptions and the first carrier list comprising carriers, wherein the carriers are radio carriers assigned to the mobile station 160, and wherein the maximum bandwidth cannot envelope all the carriers in the first carrier list.

The detailed description of some of the following features corresponds to the same description provided above, in relation to the actions described for the mobile station 160, and will thus not be repeated here.

The mobile station 160 comprises a removing circuit 801 configured to remove one or more carriers from the first carrier list, wherein to remove the one or more carriers is configured to be performed, one carrier by one carrier, until the maximum bandwidth can envelope all remaining carriers after the removing, the one or more removed carriers having the lowest priority according to the priority list. The remaining carriers comprise carriers to receive for the mobile station 160.

In some embodiments, to remove one or more carriers from the first carrier list may further comprise to remove one carrier from the first carrier list, the removed carrier having the lowest priority according to the priority list, wherein to remove one carrier is configured to result in the reduced carrier list comprising all remaining carriers after the removing the carrier having the lowest priority.

In some of these embodiments, to remove one or more carriers from the first carrier list may further comprise to calculate if the maximum bandwidth of the mobile station 160 can envelope all the remaining carriers in the reduced carrier list. When the maximum bandwidth of the mobile station 160 cannot envelope all the remaining carriers in the reduced carrier list, to remove one or more carriers from the first carrier list may further comprise to remove one or more further carriers having the lowest priority from the reduced carrier list, one by one, until the network node 110 calculates that the maximum bandwidth can envelope all the remaining carriers after the removing the one or more further carriers.

The mobile station 160 further comprises a reception circuit 802 configured to proceed with radio reception on the determined carriers.

The mobile station 160, in some embodiments may comprise a calculating circuit 803 configured to calculate that the maximum bandwidth of the mobile station 160 cannot envelope all the carriers in the first carrier list.

In some embodiments, the mobile station 160 may comprise a disabling circuit 804 configured to disable radio reception on one or more time slots associated with the removed carrier.

In some embodiments, the mobile station 160 may comprise a determining circuit 805 configured to determine, when the maximum bandwidth can envelope all the remaining carriers after the removing one or more carriers, that all the remaining carriers after the removing one or more carriers comprise carriers to receive for the mobile station 160.

In some embodiments, the mobile station 160 may comprise an obtaining circuit 806 configured to obtain the priority list of carriers from the network node 110 comprised in the wireless radio network 100, implicitly or explicitly, wherein the network node 110 is one of: the base station 120, the base station controller 140 and the core network node 150, wherein the carriers in the carrier list have been prioritized by the network node 110 in the process of resource assignment to the mobile station 160, the prioritizing being based on one or more quantities, wherein the one or more quantities comprise one of: the explicit list with carriers to prioritize, the Mobile Allocation Index Offset, MAIO, the allocation, the Absolute Radio Frequency Channel Number, ARFCN, and the carrier assignment order.

In some embodiments, the mobile station 160 may comprise a sending circuit 807 configured to send to the network node 110 the maximum bandwidth supported by the mobile station 160 for simultaneous receptions.

In some embodiments, wherein the carriers assigned to the mobile station 160, are assigned for the plurality of bursts in the radio block period, the plurality of bursts comprising the first burst and one or more additional bursts, and wherein to calculate, to remove one or more carriers from the first carrier list and to determine are configured to be performed for the first burst and then configured to be performed for each of the one or more additional bursts, and wherein to proceed is configured to be performed after the to calculate, to remove one or more carriers from the first carrier list, and the to determine have been performed for all the bursts in the plurality of bursts.

The embodiments herein for managing radio resources may be implemented through one or more processors, such as a processing circuit 808 in the mobile station 160 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the mobile station 160. One such carrier may be in the form of a CD ROM disc. It may be however feasible with other data carriers such as a memory stick. The computer program code may furthermore be provided as pure program code on a server and downloaded to the mobile station 160.

The mobile station 160 may further comprise a memory circuit 809 comprising one or more memory units. The memory circuit 809 may be arranged to be used to store data such as, the information removed, calculated, disabled, determined, obtained and/or sent by the processing circuit 808 in relation to applications to perform the methods herein when being executed in the mobile station 160. Memory circuit 809 may be in communication with the processing circuit 808. Any of the other information processed by the processing circuit 808 may also be stored in the memory circuit 809.

In some embodiments, information from the network node 110, such as the priority list, may be received through a receiving port 810. In some embodiments, the receiving port 810 may be, for example, connected to the one or more antennas in the mobile station 160. In other embodiments, the mobile station 160 may receive information from another structure in the wireless radio network 100 through the receiving port 810. Since the receiving port 810 may be in communication with the processing circuit 808, the receiving port 810 may then send the received information to the processing circuit 808. The receiving port 810 may also be configured to receive other information.

The information removed, calculated, disabled, determined, obtained and/or sent by the processing circuit 808 in relation to methods herein, may be stored in the memory circuit 809 which, as stated earlier, may be in communication with the processing circuit 808 and the receiving port 810.

The processing circuit 808 may be further configured to send or signal information, such as the maximum bandwidth supported by the mobile station 160 for simultaneous receptions to, for example, the network node 110 through a sending port 811, which may be in communication with the processing circuit 808, and the memory circuit 809.

Those skilled in the art will also appreciate that the removing circuit 801, the reception circuit 802, the calculating circuit 803, the disabling circuit 804, the determining circuit 805, the obtaining circuit 806, and the sending circuit 807 described above may refer to a combination of analog and digital circuits, and/or one or more processors configured with software and/or firmware (e.g., stored in memory) that, when executed by the one or more processors such as the processing circuit 808, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments herein are not limited to the above described embodiments. Various alternatives, modifications and equivalents may be used. Therefore, the above embodiments should not be taken as limiting the scope, which is defined by the appending claims.

In the above-description of various embodiments, it is to be understood that the terminology used herein is for the purpose of describing particular embodiments only and is not intended to be limiting. Unless otherwise defined, all terms, including technical and scientific terms, used herein have the same meaning as commonly understood by one of ordinary skill in the art to which these embodiments belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it may be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus, i.e., systems and/or devices, and/or computer program products. It is understood that a block of the block diagrams and/or flowchart illustrations, and combinations of blocks in the block diagrams and/or flowchart illustrations, may be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means, i.e., functionality, and/or structure for implementing the functions/acts specified in the block diagrams and/or flowchart block(s).

These computer program instructions may also be stored in a tangible computer-readable medium that may direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments may be embodied in hardware and/or in software, (including firmware, resident software, micro-code, etc. . . . that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification shall support claims to any such combination or subcombination.

ABBREVIATIONS

3GPP 3rd Generation Partnership Project
GERAN GSM/EDGE Radio Access Network
DL Downlink
DCDL Dual Carrier Downlink
Rel-X Release X
RF Radio Frequency
BW Bandwidth
PDCH Packet Data Physical Channel
MAIO Mobile Allocation Index Offset
MS Mobile Station
ARFCN Absolute Radio Frequency Channel Number
HSN Hopping Sequence Number
FN Frame Number
MA Mobile Allocation
PACCH Packet Associated Control Channel
PAN Piggy-Backed Ack/Nack
MCDL Multi-carrier DL

The invention claimed is:

1. A method in a network node for managing radio resources, the network node being comprised in a wireless radio network wherein a mobile station configured to operate in the wireless radio network has a maximum bandwidth for simultaneous receptions and a first carrier list comprising carriers, wherein the carriers are radio carriers assigned to the mobile station, and wherein the maximum bandwidth cannot envelope all the carriers in the first carrier list, the method comprising:
   removing one or more carriers from the first carrier list, which removing of the one or more carriers is performed, one carrier by one carrier, until the maximum bandwidth can envelope all remaining carriers after the removing, the one or more removed carriers having a lowest priority according to a priority list, and
   which remaining carriers comprise carriers to receive for the mobile station.

2. The method of claim 1, wherein the method further comprises calculating that the maximum bandwidth of the mobile station cannot envelope all the carriers in the first carrier list, and wherein the removing one or more carriers from the first carrier list further comprises:
   removing one carrier from the first carrier list, the removed carrier having the lowest priority according to the priority list, wherein the removing one carrier results in a reduced carrier list comprising all remaining carriers after the removing the carrier having the lowest priority, and
   calculating if the maximum bandwidth of the mobile station can envelope all the remaining carriers in the reduced carrier list, and
   when the maximum bandwidth of the mobile station cannot envelope all the remaining carriers in the reduced carrier list, the removing one or more carriers from the first carrier list further comprises removing one or more further carriers having a lowest priority from the reduced carrier list, one by one, until the network node calculates that the maximum bandwidth can envelope all the remaining carriers after the removing the one or more further carriers.

3. The method of claim 2, further comprising determining, when the maximum bandwidth can envelope all the remaining carriers after the removing one or more carriers, that all the remaining carriers after the removing one or more carriers comprise carriers to receive for the mobile station.

4. The method of claim 1, wherein the network node is one of: a base station, a base station controller and a core network node.

5. The method of claim 4, wherein the method further comprises prioritizing the carriers in the first carrier list in a process of resource assignment to the mobile station, the prioritizing being based on one or more quantities, the prioritizing resulting in a decision comprising the priority list.

6. The method of claim 4, further comprising receiving, from the mobile station, the maximum bandwidth supported by the mobile station for simultaneous receptions.

7. The method of claim 4, further comprising signaling the priority list to the mobile station, implicitly or explicitly.

8. The method of claim 5, wherein the one or more quantities comprise one of: an explicit list with carriers to prioritize, a Mobile Allocation Index Offset (MAIO), an allocation, an Absolute Radio Frequency Channel Number (ARFCN), and an assignment order.

9. The method of claim 3, wherein the carriers assigned to the mobile station, are assigned for a plurality of bursts in a radio block period, the plurality of bursts comprising a first burst and one or more additional bursts, and wherein the calculating that the maximum bandwidth of the mobile station cannot envelope all the carriers in the first carrier list, the removing one or more carriers from the first carrier list, and the determining are performed for the first burst and then performed for each of the one or more additional bursts.

10. A method in a mobile station for managing radio resources, the mobile station being configured to operate in a wireless radio network, the mobile station having a maximum bandwidth for simultaneous receptions and a first carrier list comprising carriers, wherein the carriers are radio carriers assigned to the mobile station, and wherein the maximum bandwidth cannot envelope all carriers in the first carrier list, the method comprising:
removing one or more carriers from the first carrier list, which removing of the one or more carriers is performed, one carrier by one carrier, until the maximum bandwidth can envelope all remaining carriers after the removing, the one or more removed carriers having a lowest priority according to a priority list, and
which remaining carriers comprise carriers to receive for the mobile station, and
proceeding with radio reception on the remaining carriers.

11. The method of claim 10, wherein the method further comprises calculating that the maximum bandwidth of the mobile station cannot envelope all the carriers in the first carrier list, and wherein the removing one or more carriers from the first carrier list further comprises:
removing one carrier from the first carrier list, the removed carrier having the lowest priority according to the priority list, wherein the removing one carrier results in a reduced carrier list comprising all remaining carriers after the removing the carrier having the lowest priority, and
calculating if the maximum bandwidth of the mobile station can envelope all the remaining carriers in the reduced carrier list, and
when the maximum bandwidth of the mobile station cannot envelope all the remaining carriers in the reduced carrier list, the removing one or more carriers from the first carrier list further comprising, removing one or more further carriers having a lowest priority from the reduced carrier list, one by one, until the network node calculates that the maximum bandwidth can envelope all the remaining carriers after the removing the one or more further carriers.

12. The method of claim 10, further comprising disabling radio reception on one or more time slots associated with the removed one or more carriers.

13. The method of claim 11, further comprising determining, when the maximum bandwidth can envelope all the remaining carriers after the removing one or more carriers, that all the remaining carriers after the removing one or more carriers comprise carriers to receive for the mobile station.

14. The method of claim 10, further comprising obtaining the priority list of carriers from a network node comprised in the wireless radio network, implicitly or explicitly wherein the network node is one of a base station, a base station controller and a core network node, wherein the carriers in the carrier list have been prioritized by the network node in a process of resource assignment to the mobile station, the prioritizing being based on one or more quantities, wherein the one or more quantities comprise one of: an explicit list with carriers to prioritize; a Mobile Allocation Index Offset (MAIO); an allocation; an Absolute Radio Frequency Channel Number (ARFCN); and a carrier assignment order.

15. The method of claim 10, further comprising sending, to the network node, the maximum bandwidth supported by the mobile station for simultaneous receptions.

16. The method of claim 13, wherein the carriers assigned to the mobile station, are assigned for a plurality of bursts in a radio block period, the plurality of bursts comprising a first burst and one or more additional bursts, and wherein the calculating that the maximum bandwidth of the mobile station cannot envelope all the carriers in the first carrier list, and the removing one or more carriers from the first carrier list are performed for the first burst and then performed for each of the one or more additional bursts.

17. A network node for managing radio resources, the network node being configured to be comprised in a wireless radio network, wherein a mobile station configured to operate in the wireless radio network has a maximum bandwidth for simultaneous receptions and a first carrier list comprising carriers, wherein the carriers are radio carriers assigned to the mobile station, and wherein the maximum bandwidth cannot envelope all the carriers in the first carrier list, the network node comprising:
a processing circuit; and
a memory;
wherein the processing circuit and memory are configured to remove one or more carriers from the first carrier list, one carrier by one carrier, until the maximum bandwidth can envelope all remaining carriers after the removing, the one or more removed carriers having a lowest priority according to a priority list, and which remaining carriers comprise carriers to receive for the mobile station.

18. The network node of claim 17, wherein the processing circuit and memory are further configured to calculate that the maximum bandwidth of the mobile station cannot envelope all the carriers in the first carrier list, and in response to said calculating, to remove one or more carriers from the first carrier list by:
removing one carrier from the first carrier list, the removed carrier having the lowest priority according to the priority list, wherein said removing of one carrier is configured to result in a reduced carrier list comprising all remaining carriers after the removing the carrier having the lowest priority; and
calculating whether the maximum bandwidth of the mobile station can envelope all the remaining carriers in the reduced carrier list; and
responsive to determining that the maximum bandwidth of the mobile station cannot envelope all the remaining carriers in the reduced carrier list, removing one or more further carriers having a lowest priority from the reduced carrier list, one by one, until the network node calculates that the maximum bandwidth can envelope all the remaining carriers after the removing the one or more further carriers.

19. The network node of claim 18, wherein the processing circuit and memory are further configured to determine, when the maximum bandwidth can envelope all the remaining carriers after the removing one or more carriers, that all the remaining carriers after the removing one or more carriers comprise carriers to receive for the mobile station.

20. The network node of claim 17, wherein the network node is one of: a base station, a base station controller and a core network node.

21. The network node of claim 20, wherein the processing circuit and memory are further configured to:
prioritize the carriers in the first carrier list in a process of resource assignment to the mobile station, wherein to prioritize is based on one or more quantities, and to prioritize results in a decision comprising the priority list.

22. The network node of claim 20, wherein the processing circuit and memory are further configured to receive from the mobile station the maximum bandwidth supported by the mobile station for simultaneous receptions.

23. The network node of any of claim 20, wherein the processing circuit and memory are further configured to signal the priority list to the mobile station, implicitly or explicitly.

24. The network node of claim 21, wherein the one or more quantities comprise one of: an explicit list with carriers to prioritize; a Mobile Allocation Index Offset (MAIO); an allocation; an Absolute Radio Frequency Channel Number (ARFCN); and an assignment order.

25. The network node of claim 19, wherein the carriers assigned to the mobile station, are assigned for a plurality of bursts in a radio block period, the plurality of bursts comprising a first burst and one or more additional bursts, and wherein the processing circuit and memory are configured to calculate that the maximum bandwidth of the mobile station cannot envelope all the carriers in the first carrier list, to remove one or more carriers from the first carrier list, and to determine for the first burst and then for each of the one or more additional bursts.

26. A mobile station for managing radio resources, the mobile station being configured to operate in a wireless radio network, the mobile station having a maximum bandwidth for simultaneous receptions and a first carrier list comprising carriers, wherein the carriers are radio carriers assigned to the mobile station, and wherein the maximum bandwidth cannot envelope all carriers in the first carrier list, the mobile station comprising:
 a processing circuit;
 a memory; and
 a receiver circuit;
wherein the processing circuit and memory are configured to:
 remove one or more carriers from the first carrier list, wherein to remove the one or more carriers is configured to be performed, one carrier by one carrier, until the maximum bandwidth can envelope all remaining carriers after the removing, the one or more removed carriers having a lowest priority according to a priority list, and
 which remaining carriers comprise carriers to receive for the mobile station, and
wherein the receiver circuit is configured to:
 proceed with radio reception on the remaining carriers.

27. The mobile station of claim 26, wherein the processing circuit and memory are further configured to:
 calculate that the maximum bandwidth of the mobile station cannot envelope all the carriers in the first carrier list,
 remove the one or more carriers from the first carrier list by:
  removing one carrier from the first carrier list, the removed carrier having the lowest priority according to the priority list, wherein said removing one carrier is configured to result in a reduced carrier list comprising all remaining carriers after the removing the carrier having the lowest priority, and
  calculating whether the maximum bandwidth of the mobile station can envelope all the remaining carriers in the reduced carrier list, and
  responsive to determining that the maximum bandwidth of the mobile station cannot envelope all the remaining carriers in the reduced carrier list, removing one or more further carriers having a lowest priority from the reduced carrier list, one by one, until the maximum bandwidth can envelope all the remaining carriers after the removing the one or more further carriers.

28. The mobile station of any of claim 26, wherein the processing circuit and memory are configured to disable radio reception on one or more time slots associated with the removed one or more carriers.

29. The mobile station of claim 27, wherein the processing circuit and memory are configured to determine, when the maximum bandwidth can envelope all the remaining carriers after the removing one or more carriers, that all the remaining carriers after the removing one or more carriers comprise carriers to receive for the mobile station.

30. The mobile station of claim 26, wherein the processing circuit and memory are configured to obtain the priority list of carriers from a network node comprised in the wireless radio network, implicitly or explicitly, wherein the network node is one of a base station, a base station controller and a core network node, wherein the carriers in the carrier list have been prioritized by the network node in a process of resource assignment to the mobile station, the prioritizing being based on one or more quantities, wherein the one or more quantities comprise one of: an explicit list with carriers to prioritize; a Mobile Allocation Index Offset (MAIO); an allocation; an Absolute Radio Frequency Channel Number (ARFCN); and a carrier assignment order.

31. The mobile station of claim 26, wherein the processing circuit and memory are configured to send to the network node the maximum bandwidth supported by the mobile station for simultaneous receptions.

32. The mobile station of claim 29, wherein the carriers assigned to the mobile station, are assigned for a plurality of bursts in a radio block period, the plurality of bursts comprising a first burst and one or more additional bursts, and wherein the processing circuit and memory are configured to calculate that the maximum bandwidth of the mobile station cannot envelope all the carriers in the first carrier list, to remove one or more carriers from the first carrier list, and to determine for the first burst and then for each of the one or more additional bursts.

* * * * *